United States Patent
Habibi et al.

(10) Patent No.: US 6,816,755 B2
(45) Date of Patent: Nov. 9, 2004

(54) METHOD AND APPARATUS FOR SINGLE CAMERA 3D VISION GUIDED ROBOTICS

(75) Inventors: Babak Habibi, North Vancouver (CA); Simona Pescaru, North Vancouver (CA)

(73) Assignee: Braintech Canada, Inc., North Vancouver (CA)

( * ) Notice: Subject to any disclaimer, the term of this patent is extended or adjusted under 35 U.S.C. 154(b) by 14 days.

(21) Appl. No.: 10/153,680

(22) Filed: May 24, 2002

(65) Prior Publication Data

US 2003/0144765 A1 Jul. 31, 2003

(51) Int. Cl.[7] .............................................. G05B 19/00
(52) U.S. Cl. ...................... 700/259; 700/245; 700/247; 700/251; 700/252; 700/258; 700/260; 318/568.11; 318/568.13; 318/573; 318/574; 318/577; 901/9; 901/14; 901/42; 901/45; 901/47
(58) Field of Search ................................ 700/245, 259, 700/258, 206, 247, 251, 252, 260; 348/46, 43, 584; 709/223, 224; 345/420, 428, 419, 502, 473, 423; 701/301; 318/568.11, 577, 568.13, 573, 574; 901/42, 14, 45, 47, 9

(56) References Cited

U.S. PATENT DOCUMENTS

| | | | |
|---|---|---|---|
| 3,986,007 A | | 10/1976 | Ruoff, Jr. |
| 4,146,924 A | | 3/1979 | Birk et al. |
| 4,219,847 A | | 8/1980 | Pinkney et al. |
| 4,305,130 A | | 12/1981 | Kelley et al. |
| 4,334,241 A | | 6/1982 | Kashioka et al. |
| 4,437,114 A | | 3/1984 | LaRussa |
| 4,578,561 A | * | 3/1986 | Corby et al. ............ 219/124.34 |
| 4,613,942 A | | 9/1986 | Chen |
| 4,654,949 A | | 4/1987 | Pryor |
| 4,835,450 A | * | 5/1989 | Suzuki ................... 318/568.13 |
| 5,083,073 A | * | 1/1992 | Kato .......................... 318/577 |
| 5,350,269 A | | 9/1994 | Azuma et al. |
| 5,454,775 A | * | 10/1995 | Cullen et al. ................ 483/16 |
| 5,696,673 A | | 12/1997 | Pryor |
| 5,956,417 A | | 9/1999 | Pryor |
| 5,959,425 A | | 9/1999 | Bieman et al. |
| 6,044,183 A | | 3/2000 | Pryor |
| 6,141,863 A | | 11/2000 | Hara et al. |
| 6,167,607 B1 | | 1/2001 | Pryor |
| 6,211,506 B1 | | 4/2001 | Pryor et al. |
| 6,301,763 B1 | | 10/2001 | Pryor |
| 6,341,246 B1 | * | 1/2002 | Gerstenberger et al. ..... 700/245 |
| 6,466,843 B1 | * | 10/2002 | Bonanni et al. ............ 700/245 |

FOREIGN PATENT DOCUMENTS

| | | |
|---|---|---|
| EP | 0 151 417 | 8/1985 |
| EP | 0 493 612 | 7/1992 |
| EP | 0 951 968 | 10/1999 |
| JP | 401124072 A * | 5/1989 |

OTHER PUBLICATIONS

Roger Y. Tsai and Reimer K. Lenz, "A New Technique for Fully Autonomous and Efficient 3D Robotics Hand/Eye Calibration", *IEEE Transactions on Robotics and Automation*, vol. 5, No. 3, Jun. 1989 p. 345.

(List continued on next page.)

*Primary Examiner*—William A. Cuchlinski, Jr.
*Assistant Examiner*—McDieunel Marc
(74) *Attorney, Agent, or Firm*—Oyen Wiggs Green & Mutala

(57) ABSTRACT

A method of three-dimensional handling of an object by a robot uses a tool and one camera mounted on the robot and at least six target features which are normal features of the object are selected on the object. The features are used to train the robot in the frame of reference of the object so that when the same object is subsequently located, the robot's path of operation can be quickly transformed into the frame of reference of the object.

19 Claims, 7 Drawing Sheets

OTHER PUBLICATIONS

Zhengyou Zhang, "A Flexible New Technique for Camera Calibration", http://research.microsoft.com/scripts/pubs/view.asp?TR_ID=MSR-TR-98-71.

Guo-Qing Wei, Klaus Arbter, and Gerd Hirzinger, "Active Self-Calibration of Robotic Eyes and Hand-Eye Relationship with Model Identification", *IEEE Transactions on Robotics and Automation*, vol. 14, No. 1, Feb. 1998 p. 158.

Yuncai Liu, Thomas S. Huang and Olivier D. Faugeras, "Determination of Camera Location from 2-D to 3-D Line and Point Correspondences", *IEEE Transactions on Pattern Analysis and Machine Intelligence*, vol. 12, No. 1, Jan. 1990 p. 28.

Chien-Ping Lu, Gregory D. Hager and Eric Mjolsness, "Fast and Globally Convergent Pose Estimation from Video Images", *IEEE Transactions on Pattern Analysis and Machine Intelligence*, vol. 22, No. 6, Jun. 2000 p. 610.

Thomas Huang, Alfred M. Bruckstein, Robert J. Holt, and Arun N. Netravali, "*Uniqueness of 3D Pose Under Weak Perspective: A Geometrical Proof*", IEEE Transactions on Pattern Analysis and Machine Intelligence, vol. 17, No. 12, Dec. 1995 p. 1220.

Denzler J. et al., "Learning, Tracking and Recognition of 3D Objects", Proceedings of the IEEE/RSJ/GI, International Conference on Intelligent Robots and Systems. contd...

Advanced Robotic Systems and the Real World. Munich, Sep. 12–16, 1994, Proceedings of the International Conference on Intelligent Robots and Systems (IROS), contd...

vol. 1, Sep. 12, 1994 (Sep. 12, 1994), pp. 89–96, XP000512662, pp. 89–96.

* cited by examiner

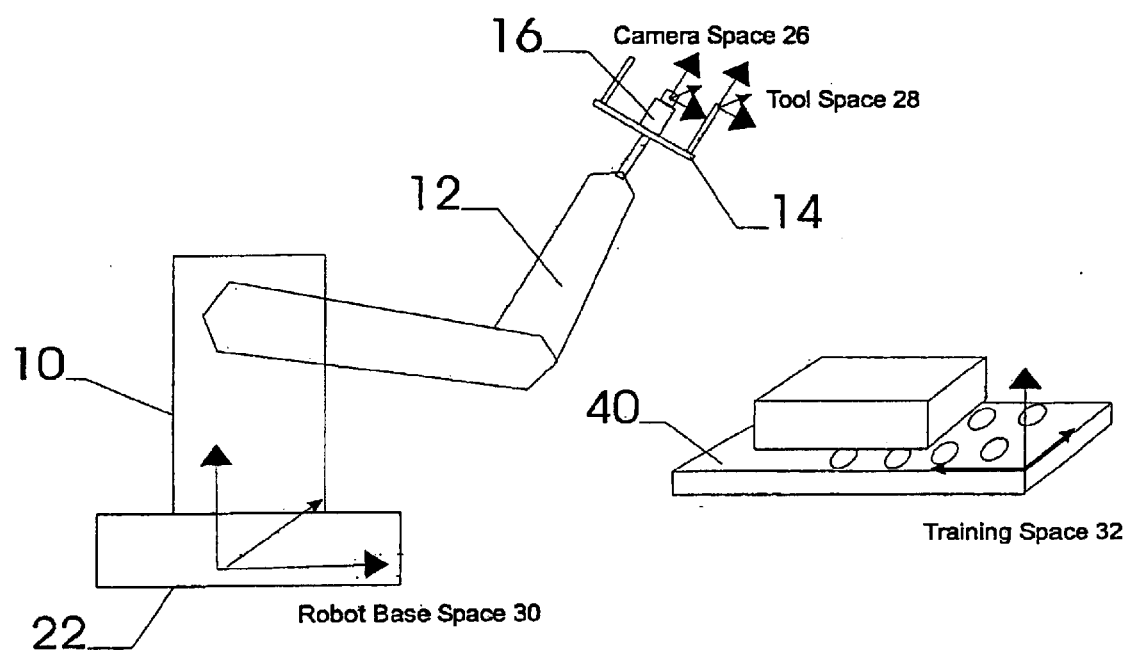
Fig. 2
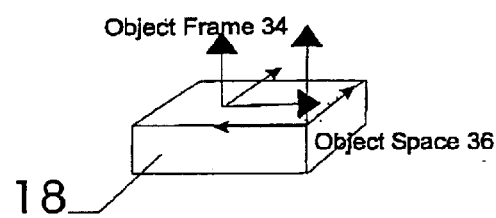

METHOD AND APPARATUS FOR SINGLE CAMERA 3D VISION GUIDED ROBOTICS

TECHNICAL FIELD

The invention relates to the field of vision guided robotics, and more particularly to a method and apparatus for single camera three dimensional vision guided robotics.

BACKGROUND

Robots have long been widely used in manufacturing processes for many applications. Many different types of sensors are used to guide the robot but machine vision is increasingly being used to guide robots in their tasks. Typically such machine vision is used in a two-dimensional application wherein the target object need only be located in an x-y plane, using a single camera. For example see U.S. Pat. No. 4,437,114 LaRussa. However many robotic applications require the robot to locate and manipulate the target in three dimensions. In the past this has involved using two or more cameras. For example see U.S. Pat. No. 4,146,924 Birk et al.; and U.S. Pat. No. 5,959,425 Bieman et al. In order to reduce hardware costs it is preferable to use a single camera. Prior single camera systems however have used laser triangulation which involves specialized sensors, must be rigidly packaged to maintain geometric relationships, require sophisticated inter-tool calibration methods and tend to be susceptible to damage or misalignment when operating in industrial environments.

Target points on the object have also been used to assist in determining the location in space of the target object using single or multiple cameras. See U.S. Pat. Nos. 4,219,847 Pinkney et al. and U.S. Pat. Nos. 5,696,673; 5,956,417; 6,044,183 and 6,301,763 all of Pryor. Typically these methods involve computing the position of the object relative to a previous position, which requires knowledge of the 3D location of the object at the starting point. These methods also tend to not provide the accuracy and repeatability required by industrial applications. There is therefore a need for a method for calculating the 3D position of objects using only standard video camera equipment that is capable of providing the level of accuracy and repeatability required for vision guidance of robots as well as other applications requiring 3D positional information of objects.

SUMMARY OF INVENTION

A method for three-dimensional handling of an object by a robot using a tool and one camera mounted on the robot end-effector is disclosed in which object features or landmarks are used to calculate the three-dimensional pose of the object. The process is performed in three main steps:

a) calibration of the camera;
b) selecting of the features on the object;
c) finding the three-dimensional pose of the object and using this information to guide the robot to the object to perform any operations (e.g. handling, cutting, etc.).

According to one aspect of the invention, the invention provides a method of three-dimensional handling or an object by a robot using a tool and one camera mounted on the robot. The method involves first calibrating the camera by finding a) the camera intrinsic parameters; b) the position of the camera relative to the tool of the robot ("hand-eye" calibration); and c) the position of the camera in a space rigid to the place where the object will be trained ("Training Space"). Next the object features are taught by a) putting the object in the "Training Space" and capturing an image of the object with the robot in the calibration position where the "Camera to Training Space" transformation was calculated; b) selecting at least 6 visible features from the image; c) calculating the 3D position of each feature in "Training Space"; d) defining an "Object Space" aligned with the "Training Space" but connected to the object and transposing the 3D coordinates of the features into the "Object Space"; c) computing the "Object Space to Camera" transformation using the 3D position of the features inside the "Object Space" and the positions of the features in the image; f) defining an "Object Frame" inside "Object Space" to be used for teaching the intended operation path; g) computing the Object Frame position and orientation in "Tool Frame" using the transformation from, "Object Frame to Camera" and "Camera to Tool"; h) sending the "Object Frame" to the robot; and i) training the intended operation path relative to the "Object Frame" using the robot. Next the object finding and positioning is carried out by a) positioning the robot in a predefined position above the bin containing the object and capturing an image of the object; b) if an insufficient number of selected features are in the field of view, moving the robot until at least 6 features can be located; c) with the positions of features from the image and their corresponding positions in "Object Space" as calculated in the training step, computing the object location as the transformation between the "Object Space" and "Camera Space"; d) using the transformation to calculate the movement of the robot to position the camera so that it appears orthogonal to the object; e) moving the robot to the position calculated in step d); f) finding the "Object Space to Camera Space" transformation in the same way as in step c); g) computing the object frame memorized at training using the found transformation and "Camera to Tool" transformation; h) sending the completed "Object Frame" to the robot; and i) using the "Tool" position to define the frame in "Robot Space" and performing the intended operation path on the object inside the "Robot Space".

According to a further aspect of the invention, there is provided a method of three-dimensional bridling of an object by a robot rising a tool and one camera mounted on the robot. The method involves first calibrating the camera by finding a) the camera intrinsic parameters; and b) the position of the camera relative to the tool of the robot ("hand-eye" calibration). Next the object features are taught by a) putting the object in the field of view of the camera and capturing an image of the object; b) selecting at least 6 visible features from the image; c) calculating the 3D position in real world co-ordinates of the selected features inside a space connected to the object ("Object Space"); d) computing the "Object Space to Camera" transformation using the 3D position of the features inside this space and the position in the image; e) defining an "Object Frame" inside "Object Space" to be used for teaching the handling path; f) computing the "Object Frame" position and orientation in "Tool Frame" using the transformation from "Object Frame to Camera" and "Camera to Tool"; g) sending the computed "Object Frame" to the robot; and h) training the intended operation path inside the "Object Frame". Next the object finding and positioning is carried out by a) positioning the robot in a predefined position above the bin containing the target object; b) if an insufficient number of selected features are in the field of view, moving the robot until at least 6 features can be located; c) with the positions of features from the image and their corresponding position in "Object Space" as calculated in the training session, computing the object location as the transformation between the "Object Space" and "Camera Space"; d) using the said transformation to calculate the movement of the robot to position the camera so that it appears orthogonal to the object; e) finding the "Object Space to Camera Space" transformation in the same way as in step d); f) computing the object frame memorized at training using the found transformation and "Camera to Tool" transformation; g) sending the computed "Object Frame" to the robot; and h) using the "Tool" position to define the frame in "Robot Space" and performing the intended operation path on the object inside the "Robot Space". The invention also provides a system for carrying out the foregoing methods.

BRIEF DESCRIPTION OF DRAWINGS

In drawings which illustrate a preferred embodiment of the invention:

FIG. 2 is a schematic diagram illustrating the relative frames of reference for calculating the position of the object;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
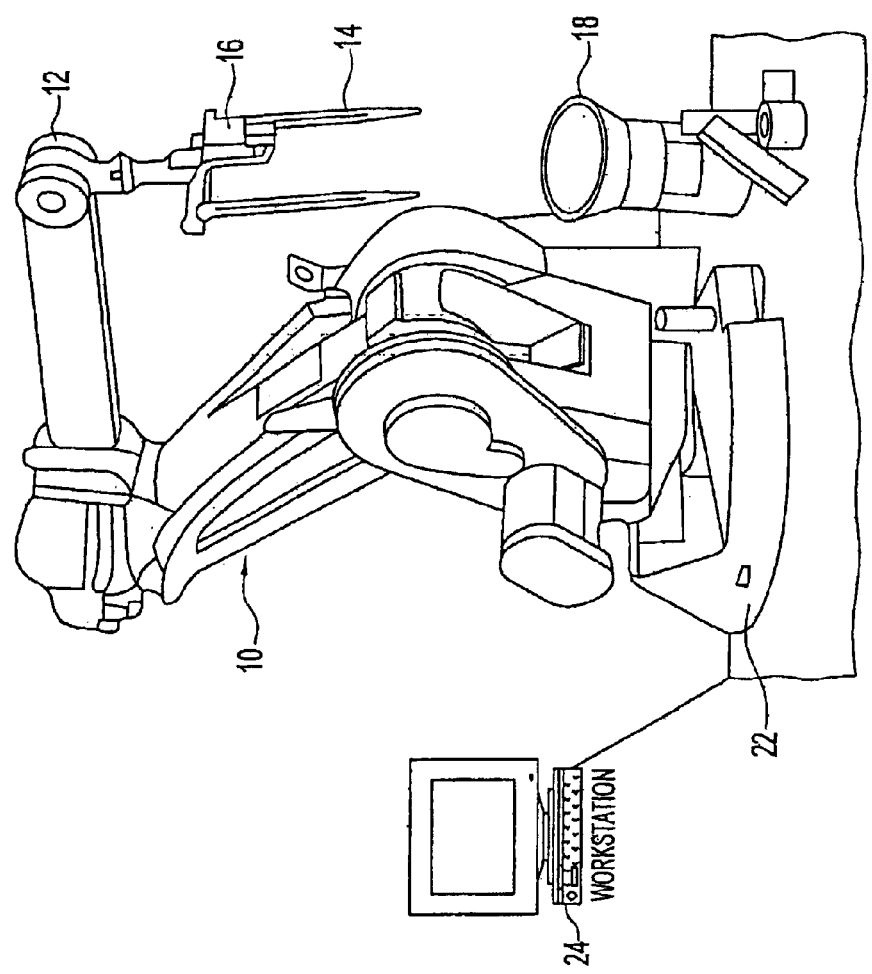
FIG. 1 is a perspective view of a vision-guided robot.

FIG. 1 shows a robot 10 having a manipulating arm 12, base 22 and attached tool 14 with camera 16 mounted thereon. Tool 14 is designed to manipulate a part or target object 18. Camera 16 is preferably a commercially available analog or digital video camera. Camera 16 and robot 10 are electrically connected to computer control station 24 for communication of data back and forth.

The method is performed in three main steps described as follows:

a) calibration of the camera;
b) teaching the features on the object; and
c) finding the three-dimensional pose of the object and using this information to guide the robot to approach the object to perform any operations (e.g. handling, cutting etc.).

In the following discussion the following terms have the following meanings, as illustrated in FIG. 2:

Transformation: three-dimensional rotation & translation between two spaces;

Tool 14: the tool the robot is using for performing the handling, having an operating end or "end-effector";

Camera Space 26: a reference frame defined with respect to a point on, and therefore rigid to, the camera 16;

Tool Space 28: a reference frame defined with respect to a point on, and oriented along the direction of the end-effector and therefore rigid to, the tool 14;

Robot base Space 30: a reference frame defined with respect to the physical base of the robot arm and therefore rigid to, the robot base 30;

Training Space 32: a reference frame defined with respect to a point on the calibration template 40, and aligned to its main axes;

Object Space 36: a reference frame defined with respect to, and therefore rigid to, the object 18;

Object Frame 34: a reference frame defined with respect to a point on, and therefore rigid to, the object 18;

Camera calibration intrinsic parameters: focal length, image center, real pixel size, and radial distortion for the lens;

Camera calibration extrinsic parameters: rotation and translation of an external space relative to the Camera Space 26.

CALIBRATION

The calibration process involves: i) finding the camera intrinsic parameters and ii) the position of the camera relative to the tool of the robot ("hand-eye" calibration). The position of the camera in the "Training Space", which is a space rigid to the place where the object will be trained is also determined. A general explanation of the basic calibration algorithms and descriptions of the variables can be found in the following publications:

"An Efficient and Accurate Camera Calibration Technique for 3D Machine Vision", Roger Y. Tsai, Proceedings of IEEE Conference on Computer Vision and Pattern Recognition, Miami Beach, Fla., 1986, pages 364–374;

"A Versatile Camera Calibration Technique for High-Accuracy 3D Machine Vision Metrology Using Off-the-Shelf TV Cameras and Lenses", Roger Y. Tsai, IEEE Journal of Robotics and Automation, Vol. RA-3, No. 4, August 1987, pages 323–344.

"Tsai's Camera Calibration Method Revisited" published on the MIT Artificial Intelligence Laboratory web site.

Tsai's camera model is based on the pin hole model of perspective projection. Given the position of a point in 3D world coordinates, the model predicts the position of the point's image in 2D pixel coordinates. Tsai's model has 11 parameters: five internal (also called intrinsic or interior) parameters:

i) f—effective focal length of the pin hole camera;
ii) kappa 1—1st order radial lens distortion coefficient;
iii and iv) Cx, Cy—coordinates of center of radial lens distortion and the piercing point of the camera coordinate frame's Z axis with the camera's sensor plane;
v) sx—scale factor to account for any uncertainty due to frame grabber horizontal scanline resampling, and six external (also called extrinsic or exterior) parameters:
i) Rx, Ry, Rz—rotation angles for the transform between the world and camera coordinate frames, and
ii) Tx, Ty, Tz—translational components for the transform between the world and camera coordinate frames.

The internal parameters describe how the camera forms an image while the external parameters describe the camera's pose (i.e. position and orientation) in the world coordinate frame. Calibration data for the model consists of 3D (x,y,z) world coordinates of a feature point (in mm. for example) and corresponding 2D coordinates (Xf,Yf) (typically in pixels) of the feature point in the image. Two forms of calibration are possible:

coplanar—the calibration points lie in a single plane in 3D, and non-coplanar—the calibration points occupy a 3D volume.

Figure 5:
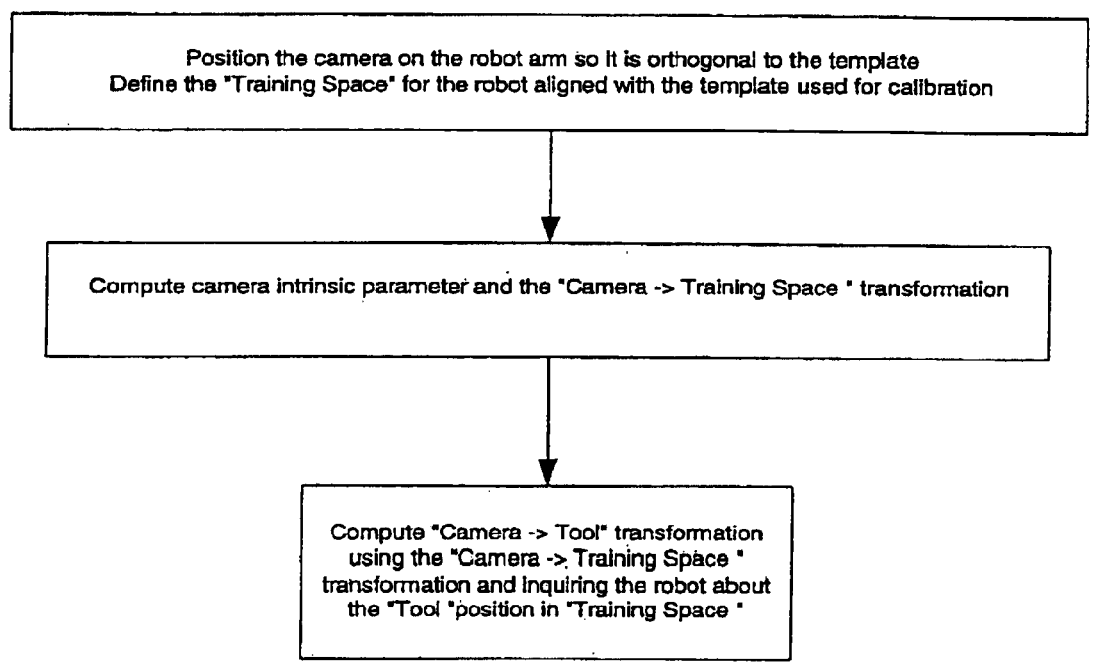
FIG. 5 is a flow chart illustrating the calibration of the camera mounted on the robot arm.

As illustrated in FIG. 2 and 5, the first step in calibration is to position the camera 16 on the robot arm 12 so it is orthogonal to a template 40 using the mirror approach, and defining the "Training Space" for the robot aligned with the template 40 used for calibration. A calibration template 40 is placed on the floor or other planar surface. It is a flat piece of paper, plastic or other medium having a series of fixed detectable features such as a grid of dots or squares. The camera 16 is positioned so that it is orthogonal to the plane of the calibration template 40, that is, so the camera's imaging plane is parallel to the template 40. The mirror approach for obtaining orthogonality comprises placing a flat mirror on the grid of the template 40 and centering the lens on the mirror in the center of the grid.

Next the camera intrinsic parameters and the "Camera→Training Space" transformation are computed considering the Training Space. Next, the "Camera→Tool" transformation is computed using the "Camera→Training Space" transformation and inquiring the robot about the "Tool" position in "Training Space". To calculate the "Camera→Training Space" transformation manually, the operator first touches 3 identifiable points on the grid having known coordinates with the tool. Next the operator stores images of the grid from at least 2 and preferably 4 measured heights above the grid.

Alternatively, the calibration can be done automatically to compute both the camera intrinsic parameter and the hand-eye calibration. The technique requires the camera to observe a planar pattern shown at a plurality of (at least two) different orientations. The pattern can be printed on a laser printer and attached to a planar surface. The position of the tool at each station is acquired directly from the robot. The operator positions the calibration pattern in front of the robot and camera and starts the procedure. The automatic calibration takes place in less than 10 minutes. The calibration can be carried out in a different location from the part training or manipulation. The calibration pattern can be mounted in a fixed position, out of the working space, and automatic calibration can take place at regular time intervals.

The following steps are carried out to perform the automatic calibration:

a) the calibration pattern is positioned in the field of view of the robot mounted camera 16;

b) the robot is moved to a plurality of stations in a predefined manner so that the calibration pattern is in the field of view at each station (see Roger Y. Tsai and Reimar K. Lenz, "A New Technique for Fully Autonomous and Efficient 3D Robotics Hand/Eye Calibration", *IEEE Transactions on Robotics and Automation*, Vol. 5, No. 3, June 1989 p. 345 at p. 350);

c) At each station the following operations are performed:
the acquired image is processed to extract the calibration points from the image;
the robot is asked for the tool position;

d) Using the calibration points information at each station, calibrate the camera intrinsic parameters end compute the extrinsic transformation from the pattern to the camera (see Zhengyou Zhang, "A Flexible New Technique for Camera Calibration" December 1998, Microsoft Research publication no. MSR-TR-98-71;

e) Using the extrinsic transformation at each station and the corresponding, tool position, the camera to tool transformation is calculated (see Tsai and Lenz reference above at p. 350).

TEACHING

Teaching the object is the process of:

a) Selection from the object's image of a set of at least 6 features, and determining the position of the features in the image. Features can be edges, holes, corners, blobs (extracted from the image) or simply a region of the image which will be used in a pattern match. Preferably, a unique feature is selected to be considered the "anchor feature". The other selected features may be small, non-unique features relative to the anchor feature.

b) Real world coordinates are computed for the selected features. The object is located in the user space, so that by using the features' height relative to the bottom of the object, the 3D position of the object features inside the Training Space can be computed using the position in the image and the Training Space to Camera transformation calculated at calibration. All these coordinates are rearranged in a space connected to the object (the first feature is the origin) and aligned with the "Training Space".

c) Also an Object Frame will be defined as rigid to the object, in a position selected by the user. Three non-co-linear points are required to define the Object Frame.

d) The Object Frame (computed in tool coordinates) is sent to the robot to be considered as the working space. To find this frame position, the transformation from Object Space to Camera is used, then from Camera Space to Tool Space.

e) Relative to the Tool Space, the operator can train the intended operation path (the tool path shown in FIG. 3) for the robot by moving the robot or alternatively by using an off-line robot programming software application to create the desired operation path with respect to the object. The latter option can eliminate the need for step d) during the Teaching process.

Figure 3:
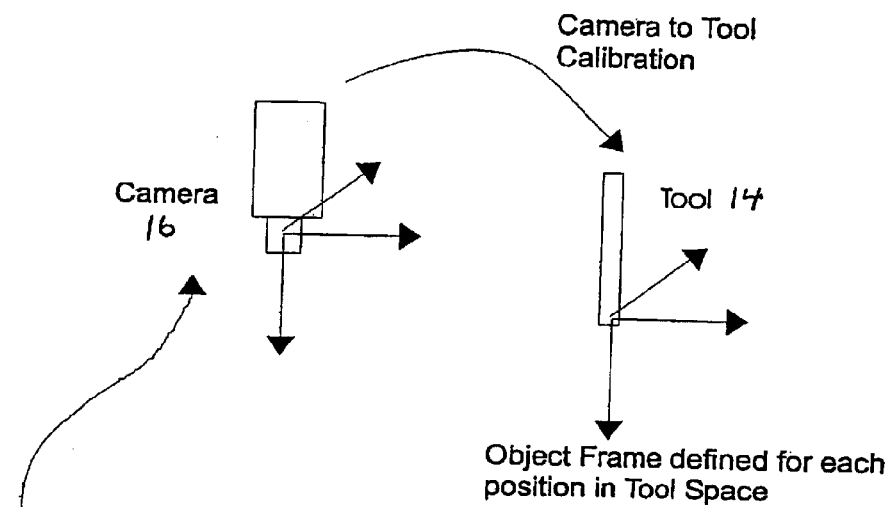
FIG. 3 is a schematic diagram illustrating the calculation of the intended operation path on the object.
Figure 3:
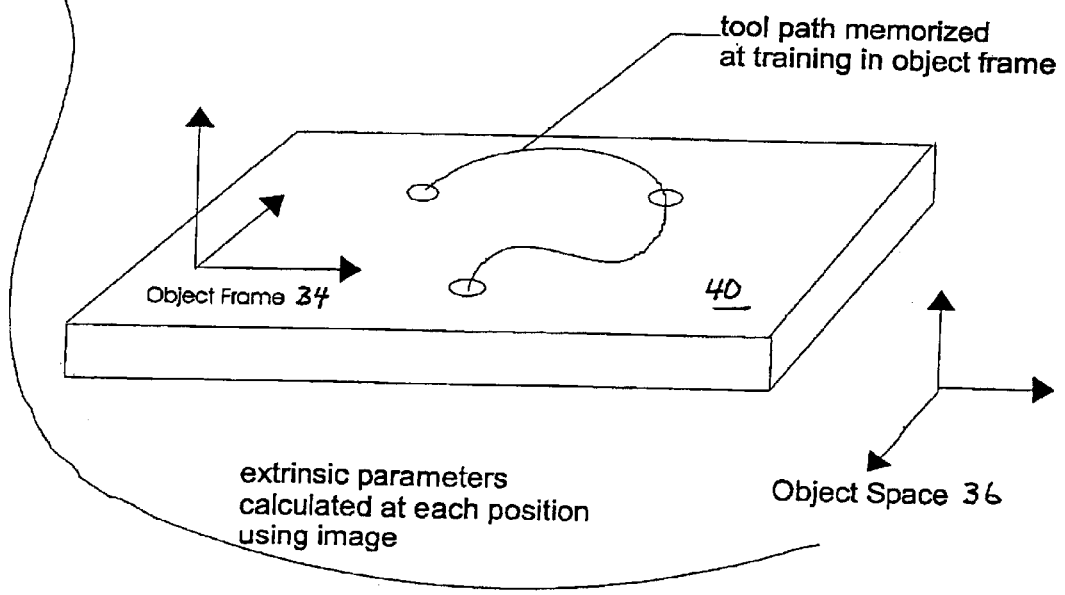
Figure 4:
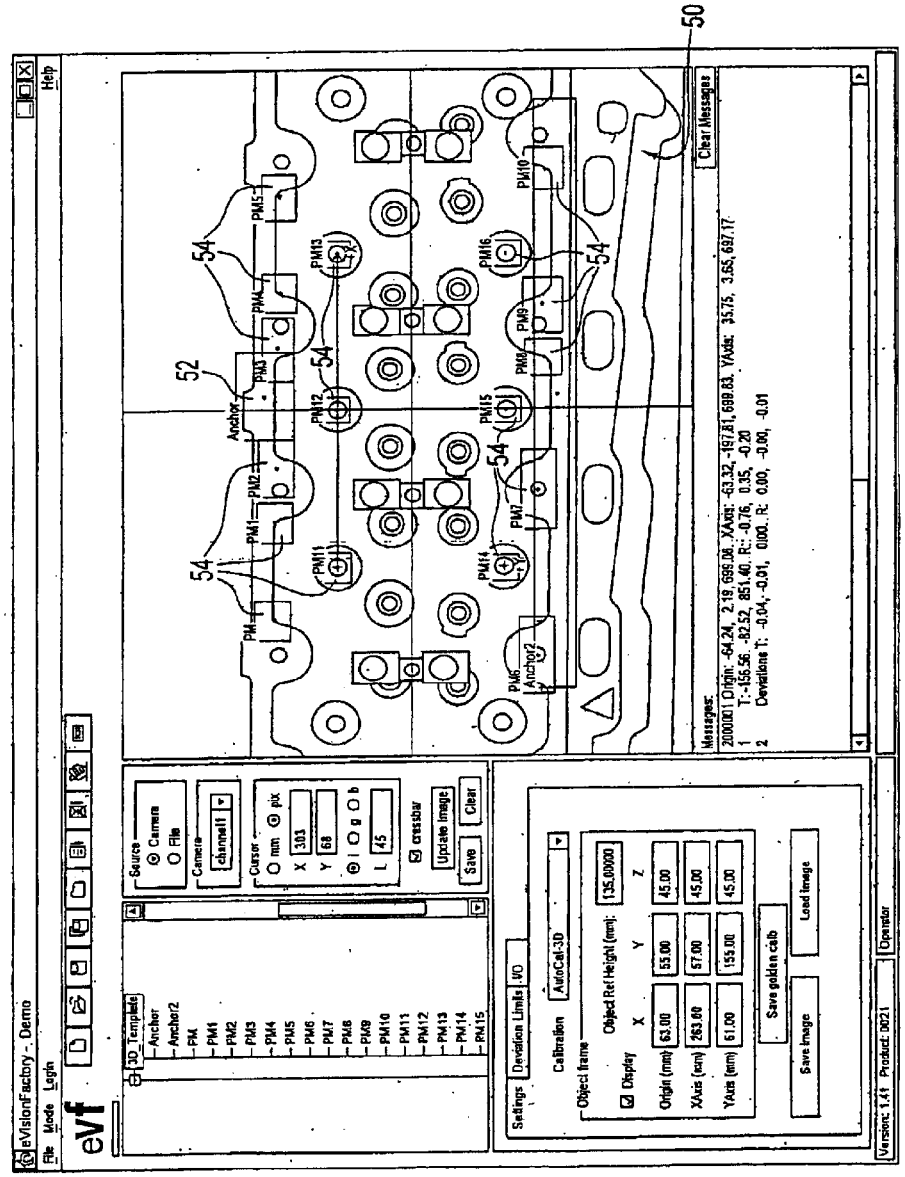
FIG. 4 is a representation of the operator's computer screen for selecting reference features on the object.
Figure 6:
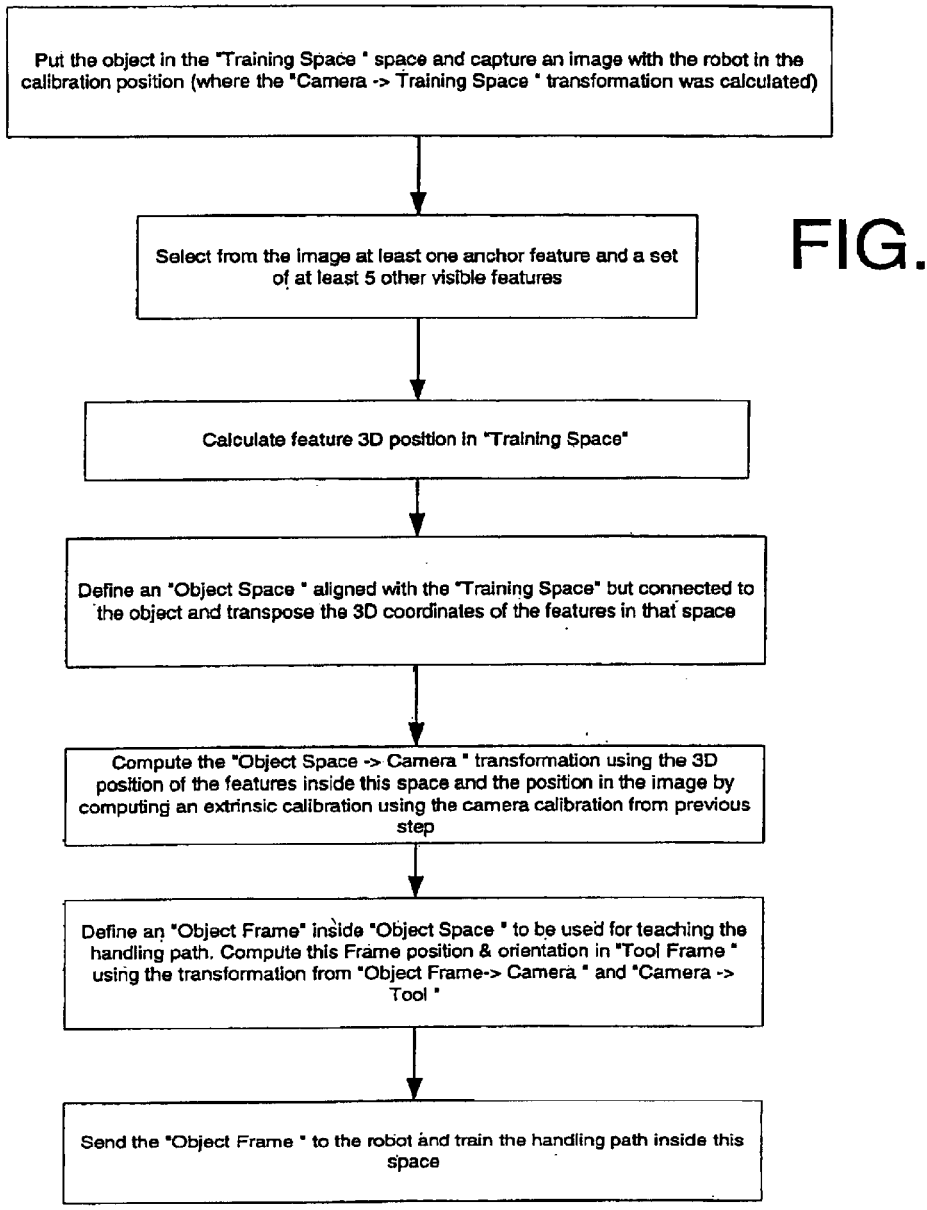
FIG. 6 is a flow chart illustrating the method of teaching the object features and handling path.

As illustrated in FIGS. 3, 4 and 6, the first step in teaching the object features is to put the object in the "Training Space" and capture an image with the robot in the calibration position (where the "Camera→Training Space" transformation was calculated). FIG. 4 illustrates the image 50 of the part as displayed on the operator's computer screen. Next, at least 6 visible features 54 are selected. Preferably at least one anchor feature 52 is selected from the image and a set of at least 5 other visible features 54 are selected and positioned relative to the anchor feature. The 3D position of each feature 54 is then calculated in "Training Space" using the height of the feature relative to the object base plane and "Camera→Training Space" transformation. An "Object Space" is then defined aligned with the "Training Space" but connected to the object and the 3D coordinates of the features are transposed into that space. The "Object Space→Camera" transformation is computed using the 3D position of the features inside this space and the position in the image by computing an extrinsic calibration using the camera calibration from the previous step using the Tsai method referenced above. Next an "Object Frame" inside "Object Space" is defined to be used for teaching the intended operation path. This Object Frame position and orientation in "Tool Frame" is computed using the transformation from "Object Frame→Camera" and "Camera→Tool". The "Object Frame" is then sent to the robot and the intended operation path is trained inside this space.

The following method may also be used for computing the 3D position of the selected features 54 automatically, without any prior knowledge about the part. The following algorithm is developed using the approach described in Guo-Quing Wei,. "Active Self-Calibration of Robotic Eyes and Hand-Eye Relationship with Model Identification", *IEEE Transactions on Robotics and Automation*, Vol. 14, No. 1, February 1999 p. 158. The camera is rigidly mounted on the robot gripper. The derived method computes the world coordinates of the features based on robot motion parameters, known camera to tool transformation, image coordinate measurements and intrinsic camera parameters. The robot tool will undergo a set of pure translation from a base position $P_0$ to a set of positions $P_j$.

The motion equations for a point $p_i$ in the image are:

$$u_{ij} - u_0 = f_x \frac{R_{cg(0,0)} * t_{g0j0} + R_{cg(1,0)} * t_{g0j1} + R_{cg(2,0)} * t_{g0j2} + X_0}{R_{cg(0,2)} * t_{g0j0} + R_{cg(1,2)} * t_{g0j1} + R_{cg(2,2)} * t_{g0j2} + Z_0}$$

$$v_{ij} - v_0 = f_y \frac{R_{cg(0,1)} * t_{g0j0} + R_{cg(1,1)} * t_{g0j1} + R_{cg(2,1)} * t_{g0j2} + Y_0}{R_{cg(0,2)} * t_{g0j0} + R_{cg(1,2)} * t_{g0j1} + R_{cg(2,2)} * t_{g0j2} + Z_0}$$

Where:

j represents the index of the station where the measurement take place;

$R_{cg}$ are elements of the rotation matrix of the camera to tool transformation;

$t_{g0j}$ represents the translation from the current station to the base position;

$u_0$, $v_0$, is the camera central point;

$u_{ij}$, $v_{ij}$, are the undistorted image coordinates of the i-th feature in the image acquired at station j. To compute these values one uses the already calibrated cameras intrinsic parameters.

At least two stations are needed for the linear system to have unique solutions, but a set of at least 3 stations is used in order to compensate for the noise in the images and other perturbation factors that may occur.

$X_0, Y_0, Z_0$ are computed for all the features in camera space, but the values can be transposed in any other space that is related to it, such as training space, tool space or even robot base space. The space in which the coordinates are represented make no difference as this space is only used to compute the current transformation to the camera and to transfer then the object frame points to the tool space.

The robot stations are located on a circle around the base to assure a uniform distribution.

The Automatic feature positioning steps are as follows:
a) the part is positioned in front of the camera 16;
b) the features 54 that are going to be used for 3D part positioning are selected;
c) the automatic training procedure is started by:
   i) moving the robot to a set of stations around the base 22;
   ii) memorizing the tool position relative to base at each station;
   iii) at each station acquiring an image, finding the visible features 54 and for those features calculating the undistorted image position;
d) for each feature solve a linear system of as many equations as the number of images the given feature was visible in;
e) the calculated positions are transformed in a space that suits the application.

Alternatively the location of the features can be sourced by using a complete CAD model of the part.

1. Object finding & positioning

To carry out object finding and positioning, the following steps are carried out:

a) The tool 14 is positioned in any predefined position above the bin with objects 18.
b) An image of the object 18 is snapped.
c) The trained features 54 are searched. If an anchor feature was selected, then a first search is done for the anchor feature 52. Using the position and orientation of the anchor feature 52 the rest of the features 54 can be found by their relative positions. This approach allows similar features to be selected as features are searched in a relatively small region of interest. Otherwise, the pattern of each feature is searched over the entire image.
d) The position (in the image 50 and in the Object Space) of the found features (at least 6) are used to calculate the transformation between the Object Space and the Camera Space using an extrinsic calibration algorithm. (See the Tsai article above). The found position is used to re-orient the camera to "look" at the object from an orthogonal position which is the one used at training. This last step is necessary if the object has major rotations, since in his case the features may be distorted and the found position may not be completely accurate.
e) Steps c) and d) above are repeated.
f) The previous space transformation is used in conjunction with the "Camera to Tool" transformation to find the position of the Object Frame in Tool Space.
g) The Object Frame is then sent to the robot to be used as the space for performing the handling.

Figure 7:
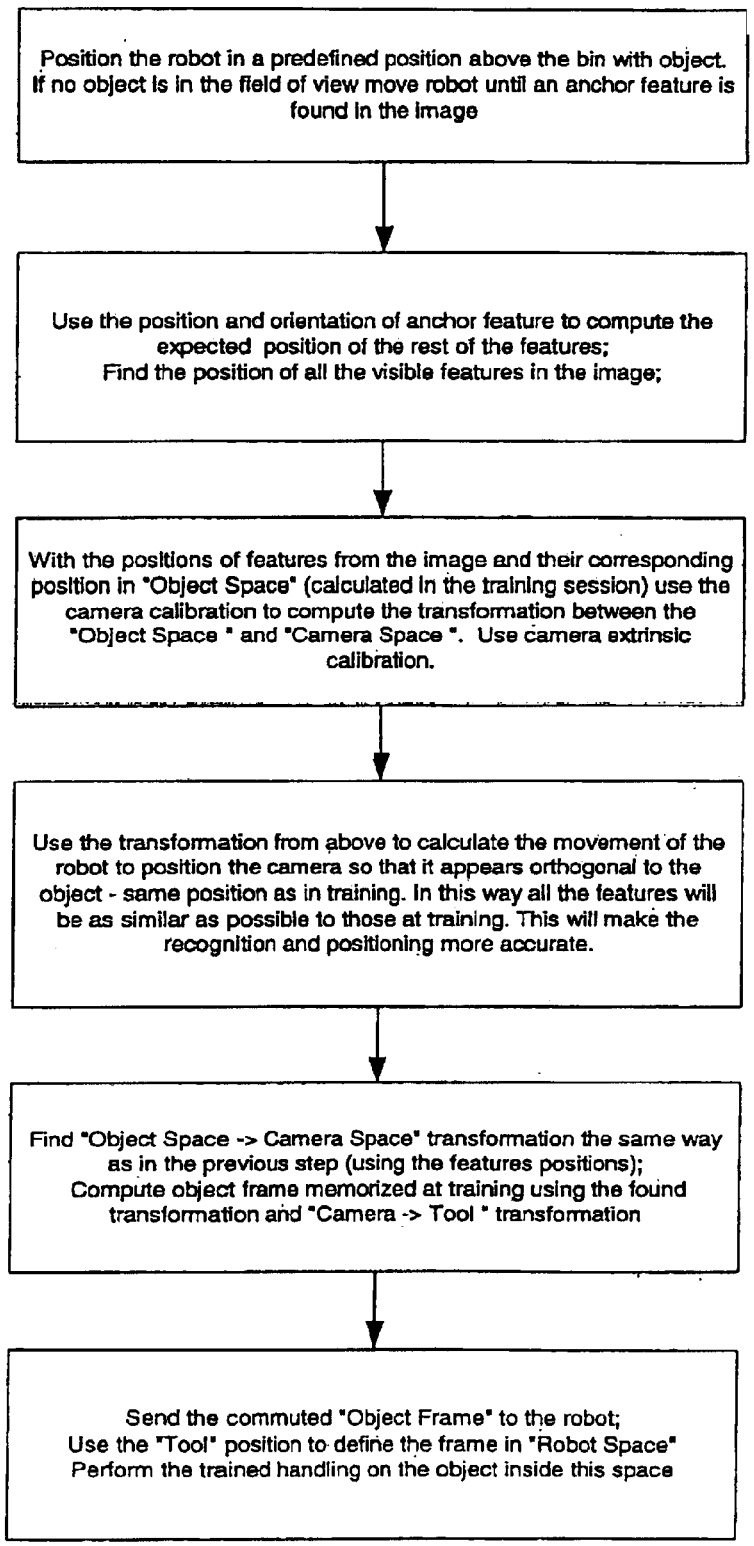
FIG. 7 is a flow chart illustrating the method of object positioning and handling.

With reference to FIG. 7, the preferred steps to carry out object finding and positioning are illustrated. First the robot is positioned in a predefined position above the bin or container that holds the target object. If no object is in the field of view, the robot is moved until an anchor feature is found in the image. Next, the position and orientation of the anchor feature is used to compute the position of the rest of the features. The position of all the visible features in the image is found. With the positions of features from the image and their corresponding position in "Object Space" (calculated in the training session) the camera calibration is used to compute the transformation between the "Object Space" and "Camera Space". The camera extrinsic calibration is used as described in the Tsai article referenced above.

Next the transformation described above is used to calculate the movement of the robot to position the camera so that it "looks" orthogonally at the object, namely the same position as in training. In this way all the features will appear as similar as possible as at training. This will make the recognition and positioning more accurate. Next the "Object Space→Camera Space" transformation is found in the same way as in the previous step (using the features positions). The object frame memorized at training is computed using the found transformation and "Camera→Tool" transformation. Next, the commuted "Object Frame" is sent to the robot. The "Tool" position is used to define the frame in "Robot Space". The trained robot path is performed inside this space.

Thus methods for teaching robots and handling of objects by robots in three dimensions using one camera mounted on the robot arm are disclosed in which targets are used on objects. The targets are normal features of the object. It is not necessary to use the CAD design of the object according to this method. The objects need not be fixtured and can be placed anywhere within the workspace of the robot. While the method has been described for one trained object, the process can be used in the same manner to first recognize the object and then find its location in three dimensions. Also the method has been described for one visible set of features selected on one side of the object, but it can be extended to all the sides that can appear in a working situation.

In the method described above, the calibration step can be carried out with just the intrinsic and hand-eye calibration (that is, without step i)c) as described above), and in that case, in teaching step ii) c, the 3D positioning of features may be provided using the CAD model of the object. Similarly in step ii) c) the 3D positioning of features can be calculated automatically, without any model or measurements on the part.

Further, training step ii) i) or h) can be eliminated by sending to the robot the positions of intended robot path points, with the positions computed using the object current position and orientation. The robot path points can be sourced from an offline robot programming software application. Also, one or more features on the object can be used as grasp points and the position of those points in robot coordinates sent to the robot to eliminate the need for manually teaching grasp points using the robot teach pendant. Alternatively the coordinates of the object frame points or other points of interest (e.g. robot path points) can be transformed using the transformation from tool to robot base and all the coordinates send to robot in the robot base coordinate frame instead.

Further, the calibration and teaching steps i) and ii) can be combined by using a self calibration method of robotic eye and hand-eye relationship with model identification as described in "Active self-calibration method of robotic eye and hand-eye relationship with model identification" by Guo-Qing Wei, Klaus Arbter and Gerd Hirzinger. The result of such a method will give camera intrinsic parameters, hand-eye calibration and position of selected features in camera space; The rest of the path training and run time will still remain the same and in this preferred approach;

In accordance with the present invention the determination of object location in step iii-c can use any of the following algorithms:
 a. 3D pose estimation using non linear optimization methods derived from the ones described in the already mentioned articles:
   "A Flexible New Technique for Camera Calibration" by Zhengyou Zhang;
   "An efficient and Accurate Camera Calibration Techniques for 3D Machine Vision" by Roger Y. Tsai;
 b. 3D pose estimation from lines correspondence (in witch case selected features will be edges) as described in "Determination of Camera Location from 2D to 3D Line and Point Correspondences" by Yucai Liu, Thomas S. Huang, Olivier D. Faugeras;
 c. pose estimation using "orthogonal iteration" described in "Fast and Globally Convergent Pose Estimation from Video Images" by Chien_Ping Lu, Gregory D. Hager, Eric Mjolsness;
 d. approximate object location under weak perspective conditions as demonstrated in "Uniqueness of 3D Pose Under Weak Perspective: A Geometric Proof" by Thomas Huang, Alfred Bruckenstein, Robert Holt, Arun Netravali;
 e. approximate object location using Direct Linear Transformation (DLT) as described in "An investigation on the accuracy of three-dimensional space reconstruction using Direct Linear Transformation techniques" by Chen, Armstrong, Raftopoulos.

In addition to use in robotics, the described method can be applied to a variety of industrial and non-industrial processes whereby knowledge of the 3D pose of an object is required.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of three-dimensional handling of an object by a robot using a tool and one camera mounted on the robot, comprising:
 i) calibrating the camera by finding
   a) the camera intrinsic parameters;
   b) the position of the camera relative to the tool of the robot ("hand-eye" calibration);
   c) the position of the camera in a space rigid to the place where the object will be trained ("Training Space");
 ii) teaching the object features by
   a) putting the object in the "Training Space" and capturing an image of the object with the robot in the calibration position where the "Camera to Training Space" transformation was calculated;
   b) selecting at least 6 visible features from the image;
   c) calculating the 3D position of each feature in "Training Space";
   d) defining an "Object Space" aligned with the "Training Space" but connected to the object and transposing the 3D coordinates of the features into the "Object Space";
   e) computing the "Object Space to Camera" transformation using the 3D position of the features inside the "Object Space" and the positions of the features in the image;
   f) defining an "Object Frame" inside "Object Space" to be used for teaching the intended operation pat;
   g) computing the Object Frame position and orientation in "Tool Frame" using the transformation from "Object Frame to Camera" and "Camera to Tool";
   h) sending the "Object Frame" to the robot;
   i) training the intended operation path relative to the "Object Frame" using the robot;
 iii) carrying out object finding and positioning by
   a) positioning the robot in a predefined position above the bin containing the object and capturing an image of the object;
   b) if an insufficient number of selected features are in the field of view, moving the robot until at least 6 features can be located;
   c) with the positions of features from the image and their corresponding positions in "Object Space" as calculated in the training step, computing the object location as the transformation between the "Object Space" and "Camera Space";
   d) using the said transformation to calculate the movement of the robot to position the camera so that it appears orthogonal to the object;
   e) moving the robot to the position calculated in step d);
   f) finding the "Object Space to Camera Space" transformation in the same way a in step c);
   g) computing the object frame memorized at training using the found transformation and "Camera to Tool" transformation;

h) sending the computed "Object Frame" to the robot; and i) using the "Tool" position to define the frame in "Robot Space" and performing the intended operation path on the object inside the "Robot Space".

2. The method of claim 1 wherein said 6 visible features comprise at least one anchor feature and at least 5 other visible features, and the position and orientation of said anchor feature is used to compute the position of the remaining set of selected features.

3. The method of claim 2 wherein the position and orientation of the anchor features is first used to estimate the position of the remaining selected features, and the actual position of the remaining selected features is then searched for and determined.

4. The method of claim 1 wherein step ii) h) and i) are carried out by allowing the user to select the desired operation path points interactively and sending to the robot the coordinates of the selected points which are computed using the object's current position and orientation.

5. The method of claim 1 wherein in step ii) i) the intended operation path points are sourced from an offline robot programming software application.

6. The method of claim 1 wherein the coordinates of the "Object Frame" points, operation path points or other points of interest are transformed using the transformation from tool to robot base and all the coordinates are sent to robot in the robot base coordinate frame.

7. The method of claim 1 wherein the determination of object location in step iii d) is carried out using any of the following algorithms:
   i) 3D pose estimation using non linear optimization refinement based on maximum likelihood criteria;
   ii) 3D pose estimation from lines correspondence in which selected features are edges using image Jacobian;
   iii) 3D pose estimation using "orthogonal iteration";
   iv) 3D pose approximation under weak perspective conditions; or
   v) 3D pose approximation using Direct Linear Transformation (DLT).

8. A method of three-dimensional handling of an object by a robot using a tool and one camera mounted on the robot, comprising:
   i) calibrating the camera by finding
      a) the camera intrinsic parameters;
      b) the position of the camera relative to the tool of the robot ("hand-eye" calibration);
   ii) teaching the object features by
      a) putting the object in the field of view of the camera and capturing an image of the object;
      b) selecting at least 6 visible features from the image;
      c) calculating the 3D position in real world coordinates of said selected features inside a space connected to the object ("Object Space");
      d) computing the "Object Space to Camera" transformation using the 3D position of the features inside this space and the position in the image;
      e) defining an "Object Frame," inside "Object Space" to be used for teaching the handling path;
      f) computing the "Object Frame" position and orientation in "Tool Frame" using the transformation from "Object Frame to Camera" and "Camera to Tool";
      g) sending the computed "Object Frame" to the robot; and
      h) training the intended operation path inside the "Object Frame";
   iii) carrying out object finding and positioning by
      a) positioning the robot in a predefined position above the bin containing the target object;
      b) if an insufficient number of selected features are in the field of view, moving the robot until at least 6 features can be located;
      c) with the positions of features from the image and their corresponding position in "Object Space" as calculated in the training session, computing the object location as the transformation between the "Object Space" and "Camera Space";
      d) using the said transformation to calculate the movement of the robot to position the camera so that it appears orthogonal to the object;
      e) finding the "Object Space to Camera Space" transformation in the same way as in step d);
      f) computing the object frame memorized at training using the found transformation and "Camera to Tool" transformation;
      g) sending the computed "Object Frame" to the robot,
      h) using the "Tool" position to define the frame in "Robot Space" and performing the intended operation path on the object inside the "Robot Space".

9. The method of claim 8 wherein said 6 visible features comprise at least one anchor feature and at least 5 other visible features and the position and orientation of said anchor feature is used to compute the position of the remaining set of selected features.

10. The method of claim 9 wherein the position and orientation of the anchor features is first used to estimate the position of the remaining selected features, and the actual position of the remaining selected features is then searched for and determined.

11. The method of claim 8 wherein, in step ii) c) said 3D positions of features are provided using a CAD model of the object.

12. The method of claim 8 wherein, in step ii) c) said 3D positions of features is calculated automatically.

13. The method of claim 8 wherein step ii) g) and h) are carried out by allowing the user to select the desired operation path points interactively and sending to the robot the coordinates of the selected points which are computed using the object's current position and orientation.

14. The method of claim 8 wherein in step ii) h) the intended operation path points are sourced from an offline robot programming software application.

15. The method of claim 8 wherein the coordinates of the "Object Frame" points, operation path points or other points of interest are transformed using the transformation from tool to robot base and all the coordinates are sent to robot in the robot base coordinate frame.

16. The method of claim 8 wherein steps i) a) and b) and ii) c) are eliminated by using a self calibration method of robotic eye and hand-eye relationship with model identification.

17. The method of claim 8 wherein the determination of object location in step iii d) is carried out using any of the following algorithm:
   i) 3D pose estimation using non linear optimization refinement based on maximum likelihood criteria;
   ii) 3D pose estimation from lines correspondence in which selected features are edges using image Jacobian;
   iii) 3D pose estimation using "orthogonal iteration";
   iv) 3D pose an approximation under weak perspective conditions; or
   v) 3D pose approximation using Direct Linear Transformation (DLT).

18. A system for three-dimensional handling of an object by a robot using a tool and one camera mounted on the robot, comprising:
- i) calibration means for calibrating the camera by finding
  - a) the camera intrinsic parameters;
  - b) the position of the camera relative to the tool of the robot ("hand-eye" calibration);
  - c) the position of the camera in a space rigid to the place where the object will be trained ("Training Space");
- ii) means for teaching the object features by
  - a) putting the object in the "Training Space" and capturing an image of the object with the robot in the calibration position where the "Camera to Training Space" transformation was calculated;
  - b) selecting at least 6 visible features from the image;
  - c) calculating the 3D position of each feature in "Training Space";
  - d) defining an "Object Space" aligned with the "Training Space" but connected to the object and transposing the 3D coordinates of the features into the "Object Space";
  - e) computing the "Object Space to Camera" transformation using the 3D position of the features inside the "Object Space" and the positions of the features in the image;
  - f) defining an "Object Frame" inside "Object Space" to be used for teaching the intended operation path;
  - g) computing the Object Frame position and orientation in "Tool Frame" using the transformation from "Object Frame to Camera" and "Camera to Too)";
  - h) sending the "Object Frame" to the robot;
  - i) training the intended operation path relative to the "Object Frame" using the robot;
- iii) means for carrying out object finding and positioning by
  - a) positioning the robot in a predefined position above the bin containing the object and capturing an image of the object;
  - b) if an insufficient number of selected features are in the field of view, moving the robot until at least 6 features can be located;
  - c) with the positions of features from the image and their corresponding positions in "Object Space" as calculated in the training step, computing the object location as the transformation between the "Object Space" and "Camera Space";
  - d) using the said transformation to calculate the movement of the robot to position the camera so that it appears orthogonal to the object;
  - e) moving the robot to the position calculated in step d);
  - t) finding the "Object Space to Camera Space" transformation in the same way as in step c);
  - g) computing the object frame memorized at training using the found transformation and "Camera to Tool" transformation;
  - h) sending the computed "Object Frame" to the robot; and
  - i) using the "Tool" position to define the frame in "Robot Space" and performing the intended operation path on the object inside the "Robot Space".

19. A system for three-dimensional handling of an object by a robot using a tool and one camera mounted on the robot, comprising:
- i) calibration means for calibrating the camera by finding
  - a) the camera intrinsic parameters;
  - b) the position of the camera relative to the tool of the robot ("hand-eye" calibration);
- ii) means for teaching the object features by
  - a) putting the object in the field of view of the camera and capturing an image of the object;
  - b) selecting at least 6 visible features from the image;
  - c) calculating the 3D position in real world co-ordinates of said selected features inside a space connected to the object ("Object Space");
  - d) computing the "Object Space to Camera" transformation using the 3D position of the features inside this space and the position in the image;
  - e) defining an "Object Frame" inside "Object Space" to be used for teaching the handling path;
  - f) computing the "Object Frame" position and orientation in "Tool Frame" using the transformation from "Object Frame to Camera" and "Camera to Tool";
  - g) sending the computed "Object Frame" to the robot; and
  - h) training the intended operation path inside the "Object Frame";
- iii) means for carrying out object finding and positioning by
  - a) positioning the robot in a predefined position above the bin containing the target object;
  - b) if an insufficient number of selected features are in the field of view, moving the robot until at least 6 features can be located;
  - c) with the positions of features from the image and their corresponding position in "Object Space" as calculated in the training session, computing the object location as the transformation between the "Object Space" and "Camera Space";
  - d) using the said transformation to calculate the movement of the robot to position the camera so that it appears orthogonal to the object;
  - e) finding the "Object Space to Camera Space" transformation in the same way as in step d);
  - f) computing the object frame memorized at training using the found transformation and "Camera to Tool" transformation;
  - g) sending the computed "Object Frame" to the robot;
  - h) using the "Tool" position to define the frame in "Robot Space" and performing the intended operation path on the object inside the "Robot Space".

* * * * *